Jan. 26, 1960  C. G. A. JOHNSON, JR  2,922,852
TROLLEY POLE MOUNTING
Filed Dec. 22, 1955  2 Sheets-Sheet 1

INVENTOR.
Carl G.A. Johnson, Jr.
BY
Kenneth W Miller
ATTORNEY.

Jan. 26, 1960  C. G. A. JOHNSON, JR  2,922,852
TROLLEY POLE MOUNTING
Filed Dec. 22, 1955  2 Sheets-Sheet 2
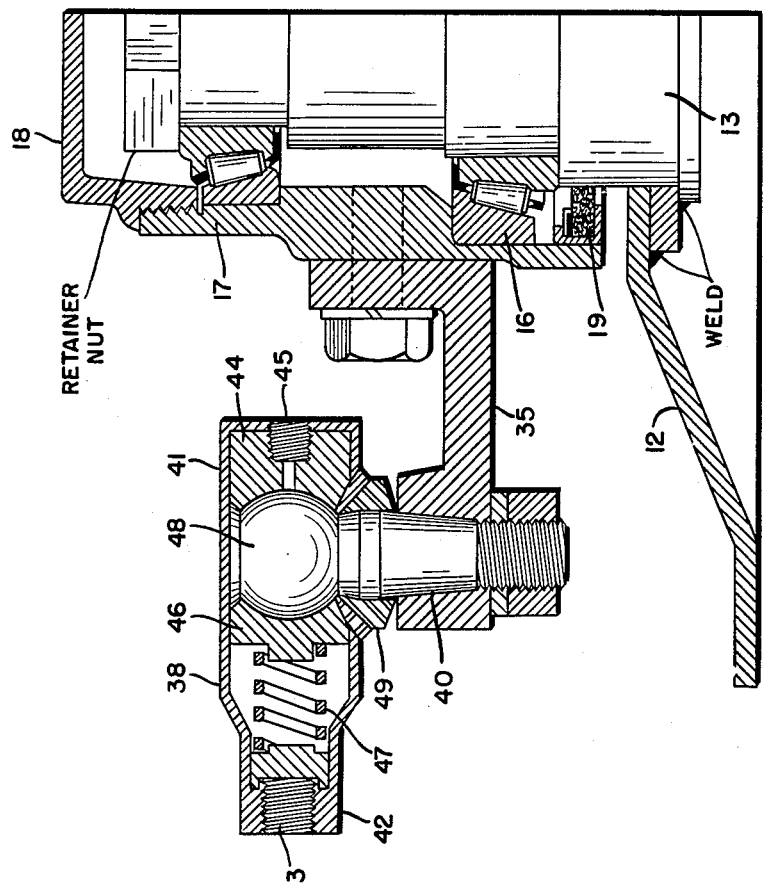
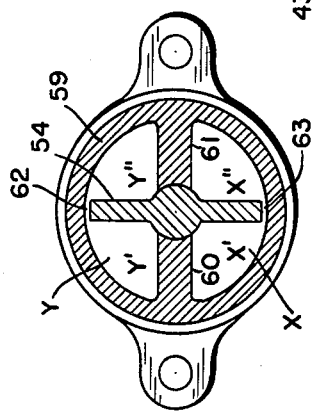
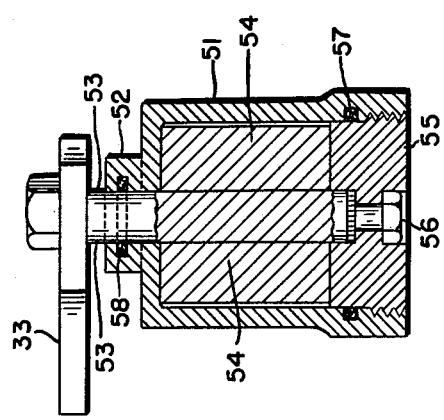
INVENTOR.
Carl G.A. Johnson, Jr.
BY
Kenneth W. Miller
ATTORNEY.

United States Patent Office 2,922,852
Patented Jan. 26, 1960

2,922,852

TROLLEY POLE MOUNTING

Carl G. A. Johnson, Jr., Mansfield, Ohio, assignor to The Ohio Brass Company, Mansfield, Ohio, a corporation of New Jersey Application December 22, 1955, Serial No. 554,673

5 Claims. (Cl. 191—66)

This invention relates to trolley equipment, and in particular to a trolley pole mounting for use with trolley coaches and the like.

A principal object of the invention is to provide an improved trolley pole mounting which is adapted to prevent excessive swinging of a trolley pole.

A further object of the invention is to provide a trolley pole mounting which resists lateral movement of the trolley pole while dissipating the inertial energy of the pole.

A still further object of the invention is to provide a trolley pole mounting in which the trolley pole is stable in any operating position, either in alignment with the axis of movement of the vehicle, or at an angle thereto.

In operating trolley coaches, difficulties are ordinarily encountered because of the lack of facilities for controlling the trolley pole when it becomes dewired. The usual trolley pole mounting is so constructed that there is no hindrance to lateral movement of the trolley pole and sudden deceleration of the coach after the current collector has been dewired may cause the pole to swing toward the front of the vehicle.

The construction of the trolley pole is such that quite substantial amounts of kinetic energy are acquired and substantial damage may be done by the swinging pole. Such devices as the trolley retrievers, which are in ordinary use, tend only to exaggerate the trouble by causing the trolley pole to swing from one direction to the other.

While the aforesaid situation has existed for some time in the industry, there has, to my knowledge, been either no recognition that a means might be devised to remedy the situation, or alternatively, if the problem has been considered, has never been successfully solved.

This application is concerned with a novel trolley pole mounting in which the trolley pole is supported from a base and carried by a pivoted turret. A new and different means is provided as part of the trolley base mounting whereby a resistive force is imparted to the turret and thence to the trolley pole, the force being determined both by the rate and extent of swinging of the trolley pole. Specifically, there is provided, according to the invention, a new and novel trolley pole mounting in which a rate damper is connected to a trolley pole pivot by means of a variable linkage.

A new and additional feature is provided in my improved mounting never before achieved in the art; namely, that the mounting will tend to hold the trolley pole stable in an operating position in which the pole is offset at an angle from the principal fore and aft axis of the coach; that is, when the coach is being operated along a path parallel to, but displaced from, the line of the trolley wire.

The invention, together with further objects, features, and advantages thereof will be more clearly understood from a consideration of the following detailed specification and claims taken in connection with the appended drawings, in which Fig. 1 is a top view of the trolley pole mounting of the invention;

Fig. 3 is a partial section view taken in a vertical plane through the line 3—3 in Fig. 1;

Fig. 4 is a section view taken in the direction 4—4 in Fig. 2;

Fig. 5 is a view partly in section and partly broken away taken in the direction 5—5 in Fig. 1.

Figure 1:
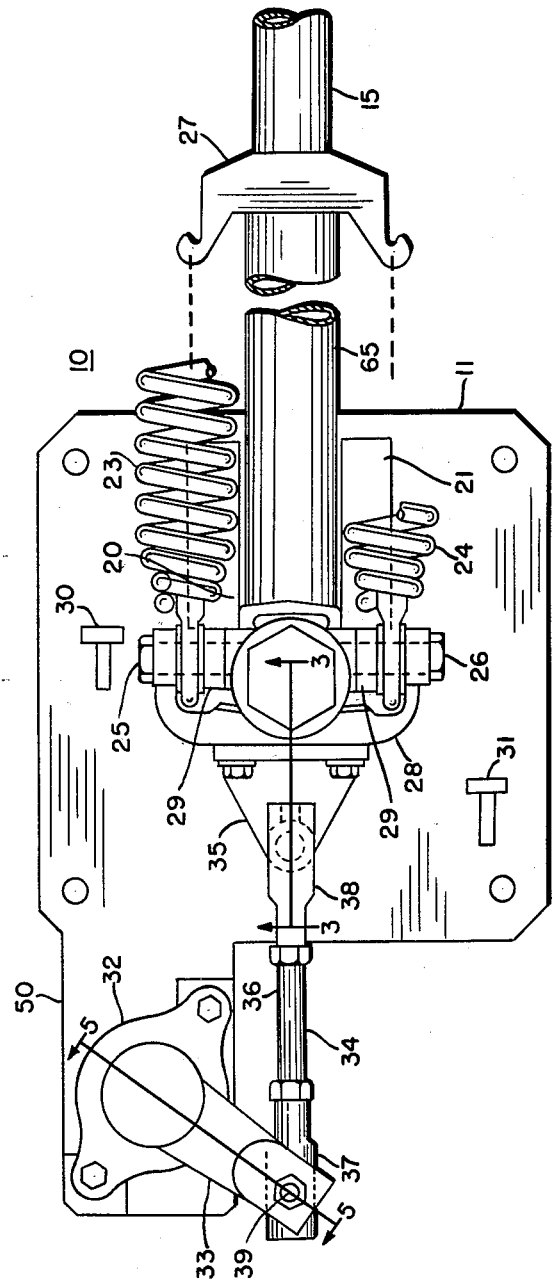
Figure 2:
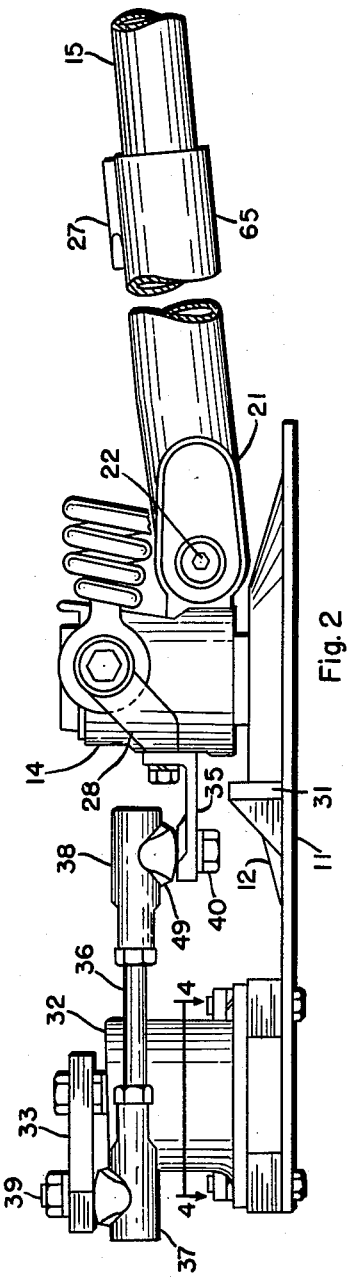
Fig. 2 is a side elevation view of the trolley pole mounting taken in the direction 2—2 in Fig. 1.

Referring particularly to Figs. 1, 2, and 3, the trolley pole mounting 10 comprises a base plate 11 which is arranged to be secured to the roof of the trolley coach. The base plate 11 is of relatively heavy construction and has an upwardly projecting portion 12 which supports a vertical pedestal 13. The pedestal 13 supports a turret 14 which carries the trolley pole 15. The turret 14 is supported from the pedestal 13 by means of two roller bearings 16 and 17 which are received upon concentric portions of the pedestal of a different diameter to facilitate assembly of the mounting.

The turret 14 is closed at its upper end by a cap 18 and is closed at its lower end by packing 19 which is carried at the lower end of the turret 14 and engages the pedestal 13.

The pole 15 is supported at its lower end by two arms 20 and 21 which are rigidly attached to the turret 14. The arms 20 and 21 carry a pintle 22 which serves as a pivot for a tubular socket member 65 which receives the trolley pole 15. The pole is further held by two erecting springs 23 and 24 which are connected at the lower end to two pins 25 and 26 and at the upper end to a cross head 27 which is secured to the socket member 65. The pins 25 and 26 are held by a yoke 28 and fit into projecting bosses 29, all cast as part of turret 14.

Two stops 30 and 31 are secured to the base and are arranged to be engaged by the lowest part of the arm 21 to limit the rotation of the turret head and trolley pole when the trolley pole moves laterally toward the front end of the vehicle.

The movement of the turret 14 and the trolley pole 15 is limited by a damper 32 which, in the embodiment of the invention shown in the drawing, is mounted forward of the turret 14 and to one side of the fore and aft center line through the turret. The damper 32 is connected to the turret 14 by means of an arm 33, a link 34, and a bracket 35 which is bolted to the yoke 28, a part of turret 14. The link 34 comprises a rod 36 having socket connectors 37 and 38 threaded on the rod at the ends thereof, and cooperating with ball studs 39 and 40 mounted on the arm 33 and bracket 35 respectively.

The two socket members 37 and 38 are of similar construction and the member 38 is shown particularly in Fig. 3. As there shown, the socket member comprises a cylindrical shell like member 41 having a solid inner end portion 42 with a thread 43 for receiving the rod 36. A fixed socket portion 44 is secured to the member 38 by means of a screw 45, which serves also while a movable socket member 46 is urged toward the fixed member by a coil spring 47. The stud 40 has a ball member 48 at the upper end thereof and is received between the two socket members. Appropriate washers 49 are provided to space the member 38 from the arm 35.

The damper 32 is arranged upon the forwardly projecting portion 50 of the base 11 so that appropriate rotation of the operating member of the damper may be had by fore and aft movement of the link 34. It will be seen that with the arrangement shown, the arm 33 has a considerable range of travel and that the possible extent of travel is the same whether the trolley pole turns clock-wise or counter clock-wise from the normal position. This arrangement has several advantages, and amongst them the fact that the damper is positioned with the movable element or vane in an extreme position so that the maximum possible travel is obtained for extreme displacements of the trolley pole.

The damper 32 is of the type known as a rate damper. That is, the resisting force is dependent solely upon the rate at which the arm 33 is turned and is not substantially dependent upon the position of the arm. As shown in Figs. 4 and 5, the damper 32 comprises a housing 51 with an upper bearing 52 through which a shaft 53 projects. The shaft 53 has a vane 54 integrally formed as a part thereof and the arm 33 affixed to the upper end of the shaft. The lower end of the shaft 53 is held by a base member 55 which is threaded into the housing 51 at the lower end thereof and forms an interior for holding a hydraulic fluid as set forth hereinafter. A stud 56 acts as a sealed bearing member for the shaft at its lower end while appropriate seals 57 and 58 are provided for the member 55 and the bearing 52 respectively.

As shown particularly in Fig. 4, the housing 51 of the damper 32 has a cylindrical part 59 with two diametrically disposed inwardly extending members 60 and 61 which cooperate with the body of the vane 54 and the shaft 53 to partition the interior of the member into two chambers. The outer edges of the vane 54 are spaced from the inner surfaces of the member 59 to form gaps 62 and 63 respectively. The gaps 62 and 63 are of predetermined radial depths to permit the hydraulic fluid to flow between parts of the chambers formed by the vane at a predetermined rate.

The chamber Y is divided into parts Y' and Y" by one part of the vane 54, while the chamber X is divided into the parts X' and X" by the remaining part of the vane 54. The resistance to movement of the vane 54 incurred by the movement of the hydraulic fluid within the chambers, e.g. between the parts Y' and Y" and X' and X", is a function of the speed at which the vane is turned. The relationship between the speed and the restraining force is, generally speaking, non-linear, with the resistive force increasing more rapidly than the rate of turning. At very slow speeds the resistive force is relatively low.

The damper 32 dissipates the energy of movement of the trolley pole and turret, the energy being converted into heat which is radiated by the housing 51.

It will be seen that the effective length of the lever arm formed by the bracket 35 depends upon the distance which the trolley pole has turned from its normal position. Since the length of the lever arm increases with increasing displacement of the trolley pole, the increased rate of turning of the vane of the damper 32 increases the resistive force exerted upon the trolley pole as the trolley pole swings to either side of its normal position. Advantageously, however, this feature is useful to maintain the trolley pole at an angle from the fore and aft axis so that if the trolley coach is operated along a lane which causes the trolley pole to be disposed at an angle, for example 30° from the fore and aft axis, the pole will be held stably in that position. The increased lever arm serves to offset, to some extent, the small resistance exerted by the hydraulic fluid at very low rates of displacement.

This application is a continuation-in-part of application Serial No. 281,360 filed April 9, 1952 by Carl G. A. Johnson, Jr.

It is to be understood that the foregoing description is not intended to restrict the scope of the invention and that various rearrangements of the parts and modifications of the design may be resorted to, giving effect to a liberal interpretation to the claims as herein set forth.

I claim:

1. A trolley pole mounting comprising a base, a pedestal projecting upwardly from the base, and a turret rotatably mounted on the pedestal with means for carrying a trolley pole thereon, a bracket extending outwardly from the turret, a rate responsive damper mounted on the base having an operating member arranged to move generally along an axis through the turret and a link pivotally connected to the operating member and to the bracket, the damper being positioned on the base with respect to the bracket on the turret so that the link and the bracket are aligned with the turret when the trolley pole is in a normal running position, whereby the turret is subjected to a damping force determined both by the rate of turning of the turret and by the displacement of the turret from the normal position.

2. A trolley pole mounting comprising a base, a pedestal projecting upwardly from the base, a turret rotatably mounted on the pedestal, means for carrying a trolley pole projecting to the rear of the turret, and a bracket projecting forwardly from the turret opposite the said carrying means, the said carrying means and the said bracket being normally disposed along a fore and aft axis through the pedestal, a rate responsive rotating damper mounted on the base forwardly of the pedestal and to one side of the said fore and aft axis, and a horizontally disposed operating arm for turning the damper with the end thereof extending transversely toward the fore and aft axis and a link pivotally connected to the operating member and to the bracket, the said bracket and link serving to translate rotation of the turret from the normal position to rotation of the damper, whereby the turret is subjected to a damping force determined both by the rate of turning of the turret and by the displacement of the turret from the fore and aft position.

3. A trolley pole mounting comprising a base, a pedestal projecting upwardly from the base, a turret rotatably mounted on the pedestal, means for carrying a trolley pole on the turret to permit the trolley pole to turn from a normal running position, a bracket extending outwardly from the turret and a link pivotally connected at one end thereof to the end of the bracket, and a rate responsive rotating damper mounted on the base with a vertically disposed operating shaft and horizontally extending operating arm pivotally connected to the link at the remaining end thereof, the damper being positioned on the base so that the link is aligned with the bracket and the turret when the turret and trolley pole are in the normal position, whereby the turret is subjected to a damping force determined both by the rate of turning of the turret and by the displacement of the turret from the normal position.

4. A trolley pole mounting comprising a base, a pedestal projecting upwardly from the base, a turret surrounding the pedestal, and bearing means for supporting the turret from the pedestal, two spaced arms projecting horizontally from the after part of the turret, a pintle extending between the arms and a tubular socket member pivoted on the pintle for receiving a trolley pole, a cross head on the socket member and a yoke disposed transversely across the fore side of the turret and a transverse pin extending through the yoke and received in a boss on the turret, and an erecting spring extending from the pin to the cross head, a damper mounted on the base forward of the turret and a transversely disposed operating member on the damper, a bracket attached to the yoke and the turret on the forward side of the turret, and a link connecting the bracket and the arm and normally aligned with the bracket and the turret and the operating member of the damper when the trolley pole is in a fore and aft operating position.

5. The invention in acordance with claim 4, and including a stop member projecting upwardly from the base so as to be engaged by the turret arms and thereby limit the forward movement of the trolley pole.

References Cited in the file of this patent

UNITED STATES PATENTS

| | | | |
|---|---|---|---|
| 832,544 | French | | Oct. 2, 1906 |
| 1,007,438 | Feja | | Oct. 31, 1911 |
| 1,013,673 | Melinski | | Jan. 2, 1912 |
| 1,362,197 | Spikes | | Dec. 14, 1920 |
| 1,770,229 | Dippman et al. | | July 8, 1930 |
| 1,889,354 | Fieldman | | Nov. 29, 1932 |
| 2,009,676 | Pennington | | July 30, 1935 |